US012659925B2

(12) United States Patent     (10) Patent No.:   US 12,659,925 B2

Lu et al.                (45) Date of Patent:     Jun. 16, 2026

(54) PAGING METHOD, DEVICE, AND STORAGE MEDIUM

(71) Applicant: GUANGDONG OPPO MOBILE TELECOMMUNICATIONS CORP., LTD., Dongguan (CN)

(72) Inventors: Fei Lu, Dongguan (CN); Yali Guo, Dongguan (CN); Haorui Yang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 664 days.

(21) Appl. No.: 18/088,247

(22) Filed: Dec. 23, 2022

(65) Prior Publication Data

US 2023/0209502 A1     Jun. 29, 2023

Related U.S. Application Data

(63) Continuation of application No. PCT/CN2021/086279, filed on Apr. 9, 2021.

(51) Int. Cl.
*H04W 68/02*       (2009.01)
*H04W 88/04*       (2009.01)

(52) U.S. Cl.
CPC ............ *H04W 68/02* (2013.01); *H04W 88/04* (2013.01)

(58) Field of Classification Search
CPC ..... H04W 68/00; H04W 68/02; H04W 76/27; H04W 8/08; H04W 88/04
See application file for complete search history.

(56) References Cited

U.S. PATENT DOCUMENTS

| | | | |
|---|---|---|---|
| 2017/0142686 A1* | 5/2017 | Zhang | ................. H04W 68/025 |
| 2020/0077253 A1 | 3/2020 | Kim et al. | |
| 2020/0245407 A1* | 7/2020 | Shan | ...................... H04W 68/02 |
| 2022/0225448 A1* | 7/2022 | Li | .......................... H04W 8/005 |

(Continued)

FOREIGN PATENT DOCUMENTS

| | | |
|---|---|---|
| CN | 108307489 A | 7/2018 |
| CN | 110402605 A | 11/2019 |
| CN | 105493622 B | 4/2020 |

(Continued)

OTHER PUBLICATIONS

International Search Report issued in International application No. PCT/CN2021/086279, mailed Jan. 6, 2022.

(Continued)

*Primary Examiner* — Nader Bolourchi
(74) *Attorney, Agent, or Firm* — BAYES PLLC

(57)          ABSTRACT

Provided in the embodiments of the present application are a paging method, a device, and a storage medium. The method comprises: an access network device receiving a message A from a core network node or a second terminal device, wherein the message A comprises first identification information, and the first identification information is used for identifying a first terminal device; and according to the first identification information, the access network device sending, to the second terminal device, a paging message for paging the first terminal device, wherein the second terminal device provides a relay service for the first terminal device. Therefore, the resource utilization rate is improved.

12 Claims, 4 Drawing Sheets

(56) References Cited

U.S. PATENT DOCUMENTS

2023/0014030 A1 * 1/2023 Li .......................... H04W 76/10

FOREIGN PATENT DOCUMENTS

| CN | 111432469 A | 7/2020 | |
| EP | 3499975 A1 * | 6/2019 | ........ H04W 52/0241 |
| WO | 2020186526 A1 | 9/2020 | |
| WO | 2020223629 A1 | 11/2020 | |
| WO | 2021034126 A1 | 2/2021 | |

OTHER PUBLICATIONS

Written Opinion of the International Searching Authority issued in International application No. PCT/CN2021/086279, mailed Jan. 6, 2022.

SA WG2 Meeting #141E (e-meeting) S2-2007686, Elbonia, Oct. 12-23, 2020, "Closing Editor's Notes in TR 23.752 based on RAN2 conclusions", Agenda Item: 8.8, Source: Qualcomm Incorporated, 16 pages.

Second Examination Opinion Notice issued in corresponding Chinese Application No. 202180051307.2, dated Oct. 9, 2024, 12 pages.

Decision of Rejection issued in corresponding Chinese Application No. 202180051307.2, mailed on Jan. 14, 2025, 14 pages.

Extended European Search Report issued in corresponding European application No. 21935617.7, mailed May 24, 2024.

Priority Review issued in corresponding Chinese application No. 202180051307.2, mailed Jun. 28, 2024.

First Office Action issued in corresponding Chinese application No. 202180051307.2, mailed Jul. 9, 2024.

ZTE, "Discussion on the paging of evolved remote UE", R2-1703034, 3GPP TSG RAN WG2 #97bis Spokane, USA, Apr. 3-7, 2017.

* cited by examiner

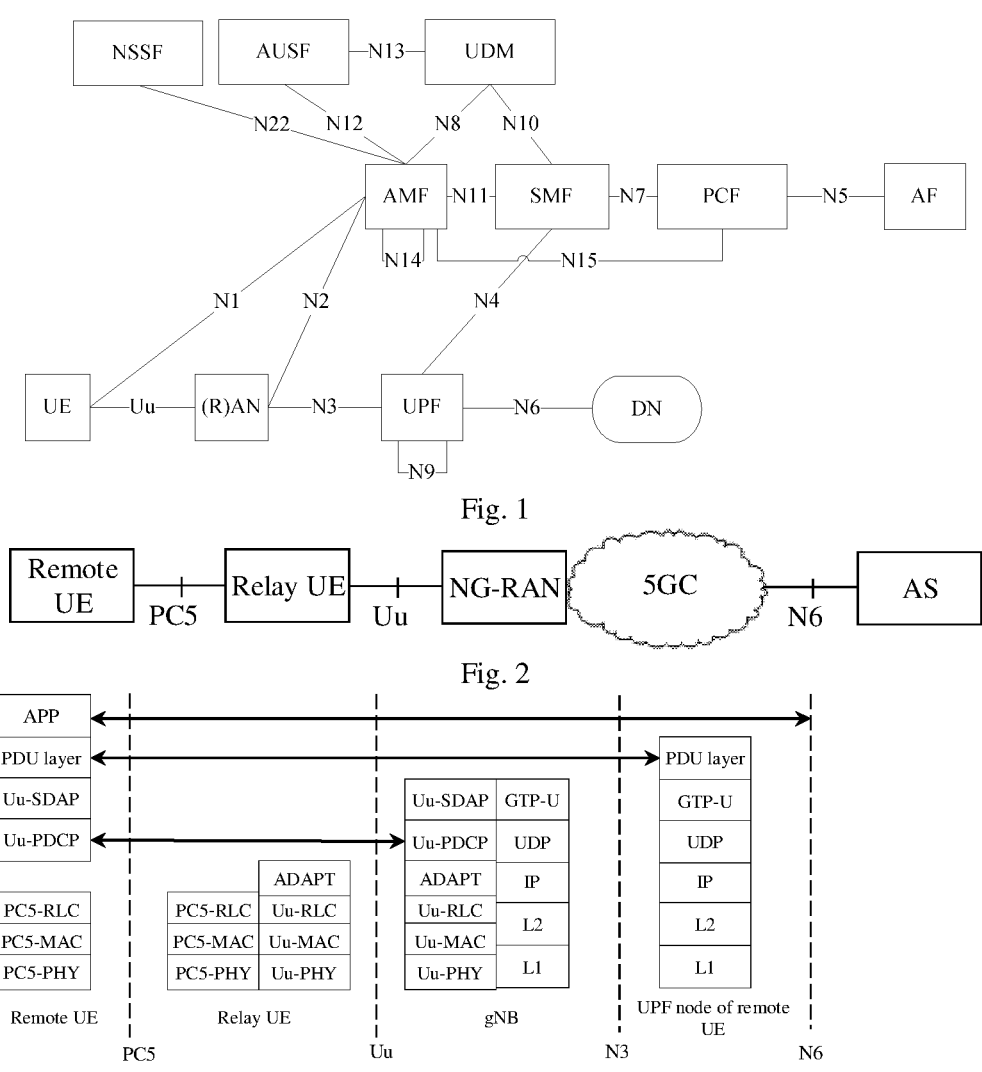
Fig. 1
Fig. 2
Fig. 3
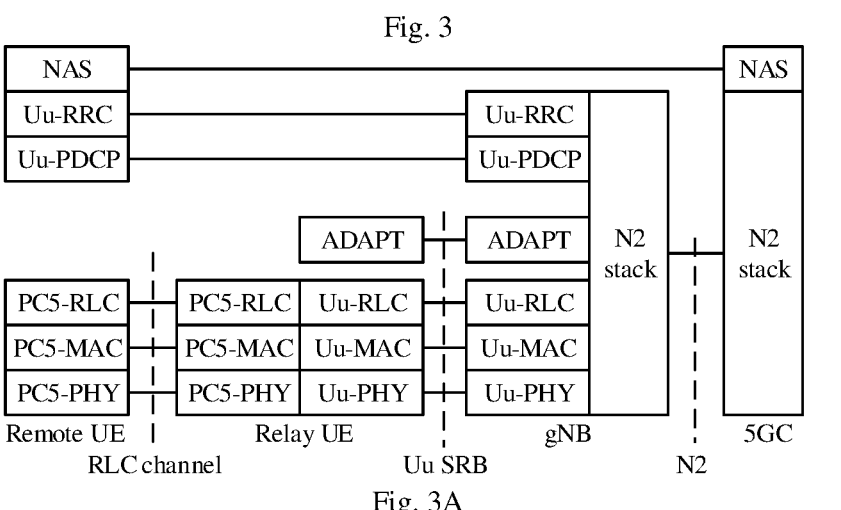
Fig. 3A

<u>400</u>

<u>500</u>

600

PAGING METHOD, DEVICE, AND STORAGE MEDIUM

CROSS-REFERENCE TO RELATED APPLICATION

The present application is a continuation of International Application No. PCT/CN2021/086279 filed on Apr. 9, 2021, the entire disclosure of which is incorporated herein by reference.

TECHNICAL FIELD

Embodiments of the present disclosure relate to communication technologies, and more particularly, to a paging method, a device, and a storage medium.

BACKGROUND

In the field of communications, a User Equipment (UE) can not only perform communication through a cellular communication interface, that is, a User Equipment-Universal Terrestrial Radio Access Network (UE-UTRAN, Uu) interface, but also perform direct communication between UEs through a sidelink communication interface, that is, a Proximity-Based Service Communication 5 (PC5) interface. The PC5 interface may be used for information transmission on a data plane and a control plane. When the user equipment is out of network coverage or the communication quality between the user equipment and a Radio Access Network (RAN) is poor, an indirect communication may also be used. That is, the relay communication is realized through a communication architecture of the PC5 interface and the Uu interface. Specifically, data from the user equipment (referred to as a remote user equipment, or a remote UE) may be transmitted to a relay user equipment (also referred to as a relay UE) through the PC5 interface. Then, the relay UE sends the data from the remote UE to a network through the Uu interface between the relay UE and a network device.

However, at present, the paging method for the network to page the remote UE when the remote UE is in an idle state still needs to be improved.

SUMMARY

Embodiments of the present disclosure provide a paging method, a device, and a storage medium, so as to improve resource utilization.

In a first aspect, embodiments of the present disclosure provide a paging method, which is applied to an access network device. The method includes: receiving a first message from a core network node, where the first message includes first identity information, and the first identity information is used for identifying a first terminal device; and sending a paging message to a second terminal device according to the first identity information, where a relay service is provided by the second terminal device for the first terminal device, and the paging message is used for paging the first terminal device.

In a second aspect, embodiments of the present disclosure further provide a paging method, which is applied to an AMF node. The method includes: sending a first message to an access network device, where the first message includes first identity information, the first identity information is used for identifying a first terminal device, second identity information is used for identifying a second terminal device, and a relay service is provided by the second terminal device for the first terminal device.

In a third aspect, embodiments of the present disclosure provide a paging method, which is applied to an access network device. The method includes: receiving a third message from a second terminal device, where the third message includes first identity information, the first identity information is used for identifying a first terminal device, and a relay service is provided by the second terminal device for the first terminal device; and sending a paging message to the second terminal device according to the first identity information, where the relay service is provided by the second terminal device for the first terminal device, and the paging message is used for paging the first terminal device.

In a fourth aspect, embodiments of the present disclosure provide a paging method, which is applied to a second terminal device. The method includes: sending a third message to an access network device, where the third message includes first identity information, and the first identity information is used for identifying a first terminal device; receiving a paging message from the access network device, where the paging message is used for paging the first terminal device; and sending the paging message to the first terminal device. The first terminal device is in a Radio Resource Control (RRC)-connected state.

In a fifth aspect, embodiments of the present disclosure provide an access network device, including: a transceiving unit, configured to receive a first message from a core network node, where the first message includes first identity information, and the first identity information is used for identifying a first terminal device; and a processing unit, configured to determine to send a paging message to a second terminal device according to the first identity information, where a relay service is provided by the second terminal device for the first terminal device, and the paging message is used for paging the first terminal device. The transceiving unit is further configured to send the paging message to the second terminal device.

In a sixth aspect, embodiments of the present disclosure further provide an AMF node, including: a processing unit, configured to determine a first message, where the first message includes first identity information, the first identity information is used for identifying a first terminal device, second identity information is used for identifying a second terminal device, and a relay service is provided by the second terminal device for the first terminal device; and a transceiving unit, configured to send the first message to an access network device.

In a seventh aspect, embodiments of the present disclosure provide a terminal device, including: a transceiving unit, configured to receive a third message from a second terminal device, where the third message includes first identity information, the first identity information is used for identifying a first terminal device, and a relay service is provided by the second terminal device for the first terminal device; and a processing unit, configured to determine to send a paging message to the second terminal device according to the first identity information, where the relay service is provided by the second terminal device for the first terminal device, and the paging message is used for paging the first terminal device. The transceiving unit is further configured to send the paging message to the second terminal device.

In an eighth aspect, embodiments of the present disclosure provide a terminal device, including: a processing unit, configured to determine a third message, where the third message includes first identity information, and the first identity information is used for identifying a first terminal device; and a transceiving unit, configured to send the third message to an access network device. The transceiving unit is further configured to: receive a paging message from the access network device, and send the paging message to the first terminal device, where the paging message is used for paging the first terminal device. The first terminal device is in a Radio Resource Control (RRC)-connected state.

In a ninth aspect, embodiments of the present disclosure further provide an access network device, including: a processor, a memory, and an interface configured to communicate with a network device. The memory is configured to store computer-executable instructions. The processor is configured to execute the computer-executable instructions stored in the memory to cause the processor to perform the paging method provided by any one of the first aspect or the third aspect.

In a tenth aspect, embodiments of the present disclosure further provide an AMF node, including: a processor, a memory, and an interface configured to communicate with a terminal device. The memory is configured to store computer-executable instructions. The processor is configured to execute the computer-executable instructions stored in the memory to cause the processor to perform the paging method provided by the second aspect.

In an eleventh aspect, embodiments of the present disclosure further provide a terminal device, including: a processor, a memory, and an interface configured to communicate with a terminal device. The memory is configured to store computer-executable instructions. The processor is configured to execute the computer-executable instructions stored in the memory to cause the processor to perform the paging method provided by the fourth aspect.

In a twelfth aspect, embodiments of the present disclosure provide a computer-readable storage medium having computer-executable instructions stored thereon. The computer-executable instructions are configured to, when executed by a processor, implement the paging method according to any one of the first aspect to the fourth aspect.

In a thirteenth aspect, embodiments of the present disclosure provide a program. The program is configured to, when executed by a processor, implement the paging method according to any one of the first aspect to the fourth aspect.

Optionally, the above-mentioned processor is a chip.

In a fourteenth aspect, embodiments of the present disclosure provide a computer program product, including program instructions. The program instructions are configured to implement the paging method according to any one of the first aspect to the fourth aspect.

In a fifteenth aspect, embodiments of the present disclosure provide a chip, including: a processing module and a communication interface. The processing module is configured to perform the paging method according to any one of the first aspect to the fourth aspect.

Further, the chip further includes a storage module (such as a memory), and the storage module is configured to store instructions. The processing module is configured to execute the instructions stored in the storage module, and execution of the instructions stored in the storage module causes the processing module to perform the paging method according to any one of the first aspect to the fourth aspect.

BRIEF DESCRIPTION OF THE DRAWINGS

FIG. 1 is a communication system architecture diagram applicable to the present disclosure;

FIG. 2 is a schematic architectural diagram of a relay communication scenario applicable to the present disclosure;

FIG. 3 is a schematic diagram of a layer2-relay user plane protocol stack provided by the present disclosure;

FIG. 3A is a schematic diagram of a layer2-relay control plane protocol stack provided by the present disclosure;

DETAILED DESCRIPTION

Figure 4:
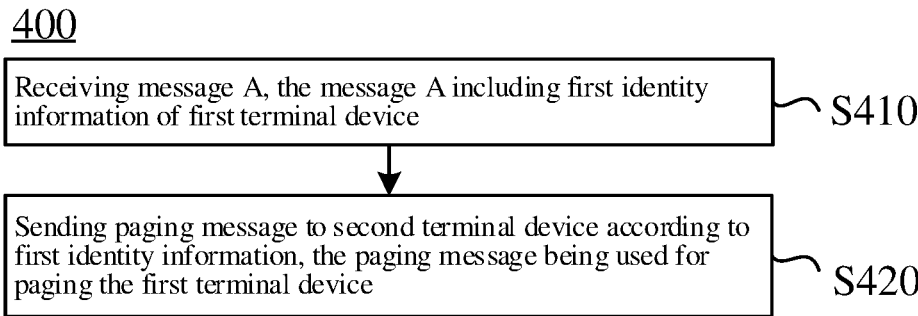
FIG. 4 is a schematic flowchart of a paging method provided by a first embodiment of the present disclosure.

In order to make objectives, technical solutions and advantages of embodiments of the present disclosure clearer, the technical solutions in embodiments of the present disclosure will be clearly and completely described below in combination with the drawings in embodiments of the present disclosure. Obviously, the described embodiments are part of embodiments of the present disclosure, rather than all the embodiments. Based on embodiments in the present disclosure, all other embodiments acquired by a person of ordinary skill in the art without creative work shall fall within the protection scope of the present disclosure.

The terms "first", "second", etc. in the description, claims, and the drawings of embodiments of the present disclosure are used to distinguish between similar objects, and are not necessarily used to describe a specific sequence or order. It should be understood that the data used in this way may be interchanged under appropriate circumstances, so that embodiments of the present disclosure described herein may be implemented in a sequence other than those illustrated or described herein, for example. In addition, the terms "include" and "have" and any variations thereof are intended to cover non-exclusive inclusions. For example, a process, method, system, product, or device that includes a series of steps or units is not necessarily limited to those steps or units clearly listed, and may include other steps or units that are not clearly listed or are inherent to the process, method, product, or device.

The technical solutions in embodiments of the present disclosure may be applied to various communication systems, for example, a Long Term Evolution (LTE) system, a LTE Frequency Division Duplex (FDD) system, a LTE Time Division Duplex (TDD), an Universal Mobile Telecommunications System (UMTS), a Worldwide Interoperability for Microwave Access (WiMAX) communication system, a 5th generation (5G) system or a New Radio (NR) system, and a future communication system, such as a 6th generation mobile communication system, etc., which is not limited by the present disclosure.

FIG. 1 is a schematic structural diagram of a communication system applicable to the present disclosure.

As shown in FIG. 1, a 5G Core (5GC) network or a New Generation Core (NGC) network includes a plurality of function units, such as an Access and Mobility Management Function (AMF) node, a Session Management Function (SMF) node, a User Plane Function (UPF) node, an Authentication Server Function (AUSF) node, a Policy Control Function (PCF) node, an Application Function (AF) node, a Unified Data Management (UDM) node, and a Network Slice Selection Function (NSSF) node, as shown in FIG. 1.

In a 5G network system architecture, the UE may perform an access layer connection with an Access Network (AN) through a Uu interface, so as to interact with each other for transmission of access layer messages and wireless data, and the UE may also perform a Non-Access Stratum (NAS) connection with an AMF node in the core network through a N1 interface, so as to interact with each other for transmission of NAS messages. The AMF node is mainly used for mobility management and access management, and the like. A SMF node in the core network refers to a node for session management function, which is mainly used for session management, Internet Protocol (IP) address allocation and management for the UE, selection and management of user plane functions, policy control, the termination point of charging function interfaces, downlink data notification, or configuring routing information for user plane functions, etc. In addition to performing mobility management on the UE, the AMF node is also responsible for forwarding information related to the session management between the UE and the SMF. The PCF node in the core network is used for guiding a unified policy framework of network behaviors, providing policy rule information for a control plane functional network element (such as the AMF network element, the SMF network element, etc.), and the like. The PCF refers to the policy control function, and is responsible for formulating policies related to the mobility management, the session management, the charging or the like for the UE. The User Plane Function (UPF) node in the core network is mainly used for packet routing and forwarding, Quality of Service (QoS) processing of user plane data, and the like. Data transmission with an external data network is performed through the N6 interface, and data transmission with the AN is performed through the N3 interface. After accessing the 5G network through the Uu interface, the UE establishes a Protocol Data Unit (PDU) session under the control of the SMF for data transmission.

The UE with the Proximity-Based Service (ProSe) capability may directly communicate with another UE with the ProSe capability through the PC5 interface.

When a UE can not only be connected to an external data network through the 5G network, but also has the ProSe capability, the UE can act as a relay UE. Another remote UE with the ProSe capability may establish a direct connection with the relay UE through the PC5 interface, and interact with the external network through a PDU session established between the relay UE and the 5G network, as shown in FIG. 2.

FIG. 3 is a schematic diagram of a layer2-relay user plane protocol stack provided by the present disclosure. As shown in FIG. 3, a relay UE is only used for transferring air interface data between a remote UE and an access network (such as the gNB in FIG. 3) serving the remote UE, a PDU session is established between the remote UE and a UPF node serving the remote UE, and data from the remote UE is forwarded to an external network through the remote UE's own PDU session. The remote UE may include a PC5 Radio Link Control (RLC) layer, a PC5 Media Access Control (MAC) layer, a PC5 Physical (PHY) layer, an Application (APP) layer, a PDU layer, a Uu Service Data Adaptation Protocol (SDAP) layer, and a Uu Packet Data Convergence Protocol (PDCP) layer. The relay UE may include a PC5-

RLC layer, a PC5-MAC layer, a PC5-PHY layer, a Uu-RLC layer, a Uu-MAC layer, a Uu-PHY layer, and an Adaptation (ADAPT) layer. The gNB may include a Uu-RLC layer, a Uu-MAC layer, a Uu-PHY layer, an adaptation layer, as well as a Uu-PDCP layer and a Uu-SDAP layer. A General Packet Radio Service (GPRS) Tunnel Protocol-User Plane (GTP-U) layer, a UDP layer, an IP layer, a data link layer (also called L2), and a physical layer (also called L1) may also be included. A UPF node of the remote UE may include a PDU layer, a GTP-U layer, a UDP layer, an IP layer, a L2, and a L1.

FIG. 3A is a schematic diagram of a layer2-relay control plane protocol stack provided by the present disclosure. As shown in FIG. 3A, a remote UE and a NAS layer of a 5GC may perform NAS signaling interactions through transparent transmission by a relay UE and a gNB. The remote UE and the gNB may perform Uu-RRC layer and Uu-PDCP layer signaling interactions through the transparent transmission by the relay UE. The remote UE and the relay UE may perform signaling interactions through a RLC channel. The relay UE and the gNB may perform signaling interactions through a Signaling Radio Bearer (SRB) of the Uu interface. The gNB and the 5GC may perform signaling interactions between N2 stacks through a N2 interface. However, the present disclosure is not limited thereto.

The terminal device in embodiments of the present disclosure may be referred to as a terminal or User Equipment (UE). The terminal device may be an access terminal, a subscriber unit, a subscriber station, a mobile station, a rover station, a remote station, a remote terminal, a mobile device, a user terminal, a terminal device, a wireless communication device, a user agent, or a user device, etc. The terminal device may also be a cellular phone, a cordless phone, a Session Initiation Protocol (SIP) phone, a Wireless Local Loop (WLL) station, a Personal Digital Assistant (PDA) device, a handheld device or a computing device with a wireless communication function, or other processing devices connected to a wireless modem, a vehicle-mounted device, a wearable device, a terminal device in a 5G network, or a terminal device in a future evolved Public Land Mobile Network (PLMN), which is not limited by embodiments of the present disclosure.

In embodiments of the present disclosure, the terminal device may also be a wearable device. The wearable device may also be called a wearable intelligent device, which is a general term of wearable devices designed intelligently and developed on daily wear using wearable technology, such as glasses, gloves, a watch, clothing, and shoes. The wearable device is a portable device that is worn directly on a body or integrated into a user's clothes or accessories. The wearable device is not only a hardware device, but also implements powerful functions through software support, data interaction, and cloud interaction. Generalized wearable intelligent devices include: a device with full features, a large size, and full or partial functions which may be implemented without relying on a smart phone, for example, a smart watch or smart glasses; as well as a device that is only focused on a certain application function and needs to cooperate with other devices such as a smart phone, for example, a smart bracelet and a smart jewelry for various physical sign monitoring. In addition, in embodiments of the present disclosure, the terminal device may also be a terminal device in an Internet of Vehicles system or an Internet of Things (IoT) system.

The network device in embodiments of the present disclosure may be a device for communicating with the terminal device. The network device may be a Base Transceiver Station (BTS) in a GSM or CDMA system, a NodeB (NB) in a WCDMA system, an evolutional NodeB (eNB or eNodeB) in a LTE system, or a wireless controller in a Cloud Radio Access Network (CRAN) scenario. Alternatively, the network device may be a relay station, an access point, a vehicle-mounted device, a network device in a 5G network, or a network device in a future evolved PLMN network, etc., which are not limited by embodiments of the present disclosure.

At present, in a case where the relay UE provides a relay service for the remote UE through the PC5 interface, if the remote UE enters an idle state, no RRC connection is established between the UE in the idle state and an access network device, which renders the access network device not saving the context of the remote UE in the idle state. When the network needs to page the remote UE, the access network device cannot determine the relay UE serving the remote UE. Accordingly, the access network device needs to send a paging message to each UE providing the relay service within the coverage, which brings a large resource overhead, and makes resource utilization low. In order to solve the above problems, embodiments of the present disclosure propose an approach where the access network device obtains identity information of the remote UE. When the remote UE is in the idle state, the access network device does not release the identity information of the remote UE, and can determine the relay UE that provides the relay service for the remote UE according to the identity information of the remote UE. When the network needs to page the remote UE, the access network device sends the paging message for paging the remote UE to the relay UE corresponding to the remote UE. This helps to avoid a case where the access network device cannot determine the relay UE corresponding to the paged UE, and thereby sends the paging message to each UE that provides the relay service within the coverage. Therefore, the resource utilization is improved.

A paging method provided by embodiments of the present disclosure will be described below with reference to the drawings.

FIG. 4 is a schematic flowchart of a paging method provided by a first embodiment of the present disclosure. In the embodiment shown by FIG. 4, a second terminal device provides a relay service for a first terminal device. That is to say, the first terminal device is a remote terminal device, and the second terminal device is a relay terminal device.

In S410, an access network device receives a message A, where the message A includes first identity information of the first terminal device.

When the second terminal device (i.e., the relay terminal device) is in a connected state, the access network device needs to keep storing the first identity information of the remote terminal device. In other words, in a case where the relay terminal device is in the connected state, the access network device does not release the first identity information of the first terminal device (the remote terminal device).

In an implementation, the second terminal device sends a third message (that is, an instance of the message A) to the access network device, where the third message includes the first identity information.

Accordingly, the access network device receives the third message from the second terminal device. The access network device may receive the third message when the first terminal device (that is, the remote terminal device) is in the connected state or in an idle state, which is not limited by the present disclosure.

By way of example but not limitation, the third message is a remote device report message.

According to the received third message, the access network device may determine the first identity information of the first terminal device for which the second terminal device provides the relay service.

After receiving the third message, the access network device sends a fourth message to the second terminal device. The fourth message is an acknowledgment response message to the third message, and is used for notifying the second terminal device that the third message has been successfully received. For example, the fourth message may be an acknowledgment message reported by the remote terminal device. However, the present disclosure is not limited thereto.

In another implementation, a core network node sends a first message (that is, another instance of the message A) to the access network node, where the first message includes the first identity information.

In the control plane protocol stack shown by FIG. 3A, after receiving the first message, the gNB carries the first identity information of the first terminal device (that is, the remote UE) in the Adaption (ADAPT) layer on the Uu interface, and information of other layers is the same as information of the second terminal device (that is, the relay UE). Thus, the gNB may perform a relay association between the second terminal device and the first terminal device. That is, the second terminal device provides the relay service for the first terminal device.

Accordingly, the access network device receives the first message from the core network node. The access network device may receive the first message when the first terminal device (that is, the remote terminal device) is in the connected state or in the idle state, which is not limited by the present disclosure.

By way of example but not limitation, the core network node is an AMF node.

According to the received first message, the access network node may determine the first identity information of the first terminal device for which the second terminal device provides the relay service.

After receiving the first message, the access network device sends a second message to the core network node. The second message is an acknowledgment response message to the first message, and is used for notifying the core network node that the first message has been successfully received.

By way of example but not limitation, the first identity information is a Globally Unique Temporary Identity (GUTI) or a Serving-Temporary Mobile Subscriber Identity (S-TMSI).

In S420, the access network device sends a paging message to the second terminal device, where the paging message is used for paging the first terminal device.

When the second terminal device enters the idle state, and if there is downlink data to be sent at a network side, the network side needs to page the second terminal device, and the AMF node sends the paging message to the access network node. The paging message carries third identity information of the second terminal device, and is used for paging the first terminal device.

By way of example but not limitation, the third identity information is the GUTI or the S-TMSI.

It should be noted that the S-TMSI of a terminal device is truncated information of the GUTI of the terminal device. That is, the S-TMSI is a part of the GUTI, and the GUTI includes the S-TMSI. That is to say, the third identity information is the first identity information, or the first identity information is truncated information of the third identity information, or the third identity information is truncated information of the first identity information.

After receiving the paging message from the AMF node, the access network device determines that the paging message needs to be forwarded. According to the third identity information, the access network device may determine that a target device receiving the paging message is the first terminal device, and further determine that the relay terminal device for the first terminal device is the second terminal device. The access network device forwards the paging message to the second terminal device, and then the second terminal device forwards the paging message to the first terminal device.

According to the above appraoch, when the network needs to page the remote UE, the access network device sends the paging message for paging the remote UE to the relay UE corresponding to the remote UE. This helps to avoid a case where the access network device cannot determine the relay UE corresponding to the paged UE and thereby sends the paging message to each UE that provides the relay service within the coverage. Therefore, the resource utilization is improved.

Figure 5:
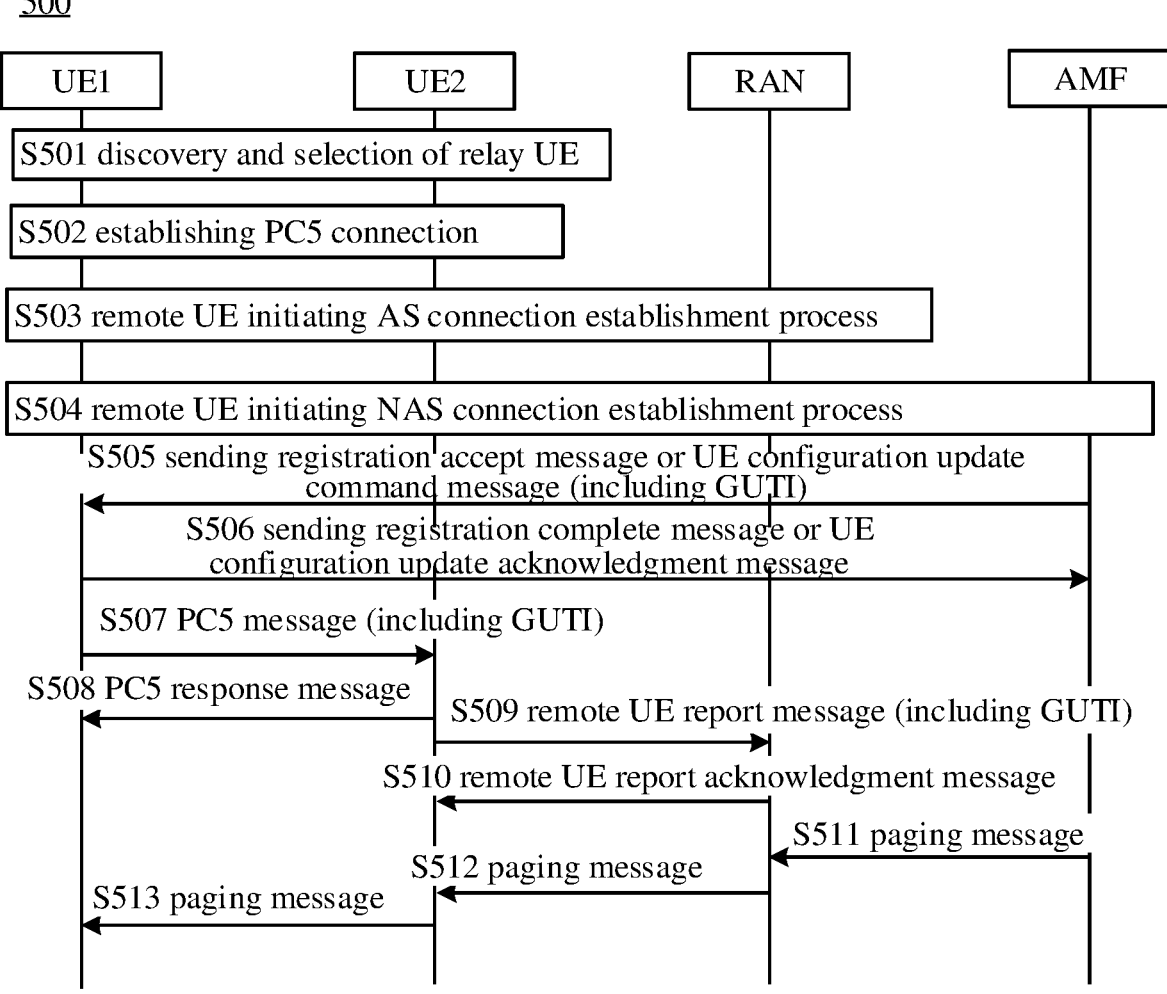
FIG. 5 is a schematic flowchart of a paging method provided by a second embodiment of the present disclosure.

FIG. 5 is a schematic flowchart of a paging method provided by a second embodiment of the present disclosure.

In S501, UE1 and UE2 perform a discovery and selection process of a relay UE.

In this process, UE1 selects UE2 as the relay terminal device. In S502, a PC5 connection is established between UE1 and UE2, so as to realize sidelink communication between UE1 and UE2.

In S502, the PC5 connection is established between UE1 and UE2.

In S503, UE1 initiates an Access Stratum (AS) connection establishment process.

UE1 sends an AS message to a RAN device through UE2 to establish the AS connection.

In S504, UE1 initiates a NAS connection establishment process.

UE1 sends a NAS message to the AMF node to request establishment of the NAS connection. The NAS message is packaged in an RRC message, and the RRC message is packaged in a PC5 message and sent to UE2. UE2 sends the PC5 message to the RAN device, and then the RAN device forwards the PC5 message to the AMF node.

In S505, the AMF node sends a registration accept message or a UE configuration update command message to UE1.

In the registration process of UE1, the AMF node may send the registration accept message to UE1, and carry a 5G-GUTI through the registration accept message to notify the 5G-GUTI of UE1. After the registration process, the AMF node may update the 5G-GUTI of UE1 through the UE configuration update command message according to a policy. For example, the policy may be regularly updating the GUTI, avoiding the temporary identity being tracked, etc., but the present disclosure is not limited thereto.

Accordingly, UE1 receives the registration accept message or the UE configuration update command message from the AMF node. The GUTI of UE1 is included in the registration accept message or the UE configuration update command message. It should be noted that, in an embodiment, the first identity information being the GUTI is taken as an example for illustration, but the present disclosure is not limited thereto. The first identity information may also be the S-TMSI or other identity information for identifying UE1.

In S506, UE1 sends a registration complete message or a UE configuration update acknowledgment (ACK) message to the AMF node.

If the AMF node sends the registration accept message to UE1 in S505, then UE1 sends the registration completion message to the AMF node in S506, so as to notify the AMF node that the registration is complete. Accordingly, the AMF node receives the registration accept message from UE1, and determines that UE1 has completed registration.

If the AMF node sends the UE configuration update command message to UE1 in S505, then UE1 sends the UE configuration update acknowledgment message to the AMF node in S506. Accordingly, the AMF node receives the UE configuration update acknowledgment message from UE1, so as to confirm completion of the UE configuration update.

In S507, UE1 sends a PC5 message to UE2, where the PC5 message includes the GUTI of UE1.

Accordingly, UE2 receives the PC5 message from UE1, and UE2 obtains the GUTI of UE1 through the PC5 message, so that UE2 receives the paging message for UE1 according to the GUTI of UE1.

In S508, UE2 sends a PC5 response message to UE1.

Accordingly, UE1 receives the PC5 response message from UE2.

In S509, UE2 sends a remote UE report message (that is, an instance of the third message) to the RAN device, and the remote UE report message includes the GUTI of UE1.

Accordingly, the RAN device receives the remote UE report message from UE2, and determines the GUTI of UE1 for which UE2 provides the relay service according to the remote UE report message. Optionally, in a case where UE2 is in the connected state, the RAN device needs to store the GUTI. That is to say, in a case where UE2 is in the connected state, the RAN device does not release the GUTI of the remote terminal device for which UE2 provides the relay service, so as to determine, according to the GUTI, that the UE corresponding to the GUTI is the remote terminal device for which UE2 provides the relay service, for forwarding the paging message.

In S510, the RAN device sends a remote UE report acknowledgment message to UE2.

Accordingly, UE2 receives the UE report acknowledgment message from the RAN device, so as to determine that the remote UE report acknowledgment message is correctly received.

In S511, the AMF node sends a paging message to the RAN device.

When UE1 enters the idle state, and if there is downlink data to be sent at the network side, the network side needs to page the UE, and the AMF node sends a paging message for paging UE1 to the RAN device. The paging message includes the S-TMSI. Accordingly, the RAN device receives the paging message from the AMF node.

In S512, the RAN device sends the paging message to UE2.

If UE2 is in the connected state, after receiving the paging message from the AMF node, the RAN device may determine that the paging message is used for paging UE1 according to the S-TMSI in the paging message. Specifically, since the S-TMSI is the truncated information of GUTI, the RAN device may determine that the S-TMSI is the paging message for UE1 according to the GUTI of UE1. The RAN device may determine that UE1 identified by the GUTI is the UE for which UE2 provides the relay service.

If UE2 is in the idle state, the RAN device broadcasts the paging message on a paging channel. Accordingly, when UE2 is in the idle state, paging messages for UE2 and UE1 are detected on the paging channel.

In S513, UE2 sends the paging message to UE1.

After UE2 receives the paging message from the RAN device in S512, UE2 determines that the paging message is used for paging UE1, and then UE2 forwards the paging message to UE1.

Figure 6:
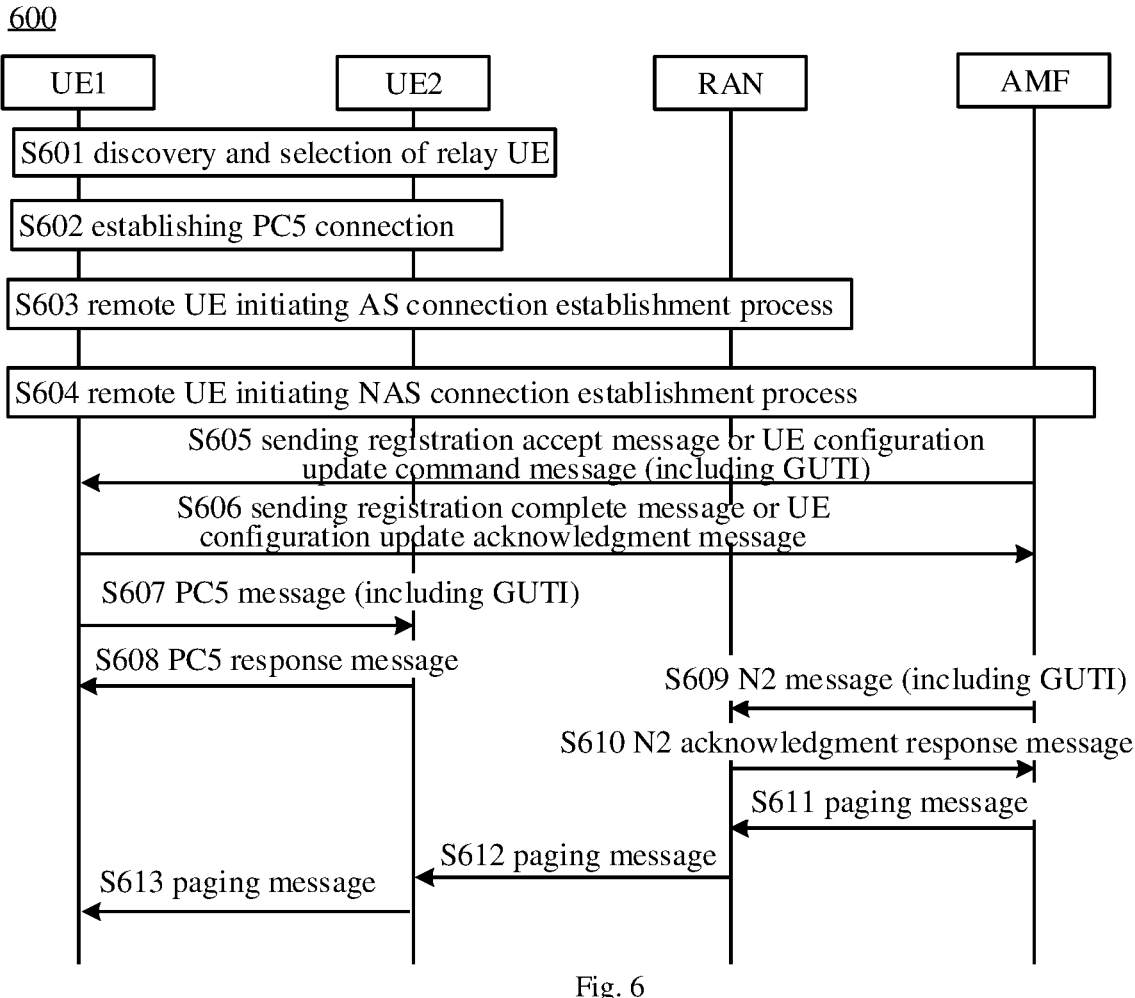
FIG. 6 is a schematic flowchart of a paging method provided by a third embodiment of the present disclosure.

FIG. 6 is a schematic flowchart of a paging method provided by a third embodiment of the present disclosure.

It should be noted that S601 to S608 in the third embodiment shown by FIG. 6 sequentially correspond to and are the same as S501 to S508 in the embodiment shown by FIG. 5, which will not be repeated here for brevity.

In S609, the AMF node sends a N2 message to the RAN device, where the N2 message includes the GUTI of UE1.

Accordingly, the RAN device receives the N2 message from the AMF node.

According to an implementation, in the control plane protocol stack shown by FIG. 3A, after receiving the N2 message, the gNB carries the GUTI of UE1 (that is, the remote UE) in the Adaption (ADAPT) layer on the Uu interface, and information of other layers is the same as information of UE2 (that is, the relay UE), so that the gNB may perform a relay association between UE2 and UE1. That is, UE2 provides the relay service for UE1.

According to another implementation, the N2 message further includes identity information of UE2. The N2 message is specifically used for indicating the GUTI of UE1 for which UE2 provides the relay service. After receiving the N2 message, the RAN device may determine the GUTI of UE1 for which UE2 provides the relay service according to the N2 message.

It should be noted that in the third embodiment, the first identity information being the GUTI is taken as an example for illustration, but the present disclosure is not limited thereto, and the first identity information may also be the S-TMSI or other identity information used for identifying UE1.

Optionally, in a case where UE2 is in the connected state, the RAN device needs to store the GUTI of UE1. That is to say, in the case where UE2 is in the connected state, the RAN device does not release the GUTI of the remote terminal device for which UE2 provides the relay service. Thus, the RAN device may determine, according to the GUTI, that the UE corresponding to the GUTI is the remote terminal device for which UE2 provides the relay service, so as to forward the paging message.

In S610, the RAN device sends a N2 acknowledgment response message to the AMF node.

Accordingly, the AMF node receives the N2 acknowledgment response message from the RAN device, so as to confirm that the RAN device has successfully received the N2 message.

It should be noted that in flowcharts according to embodiments of the present disclosure, step numbers are only used to identify corresponding steps, an order in which each device and node executes steps is determined by a logical relationship between the respective steps, and the step numbers do not limit the order of execution between the steps. For example, S609 may be performed after S606, and the present disclosure does not limit the order of execution with respect to S609, S607, and S608. But the present disclosure is not limited thereto.

S611 to S613 shown in FIG. 6 sequentially correspond to and are the same as S511 to S513 shown in FIG. 5. For a specific implementation, reference may be made to the above description of FIG. 5, which is not repeated here for brevity.

According to the above approach, when the network needs to page the remote UE, the access network device sends the paging message for paging the remote UE to the relay UE corresponding to the remote UE. This helps to avoid a case where the access network device cannot determine the relay UE corresponding to the paged UE and thereby sends the paging message to each UE that provides the relay service within the coverage. Therefore, the resource utilization is improved.

The method provided by embodiments of the present disclosure is described in detail with reference to FIG. 4 to FIG. 6 as above. An apparatus provided by embodiments of the present disclosure is introduced below.

Figure 7:
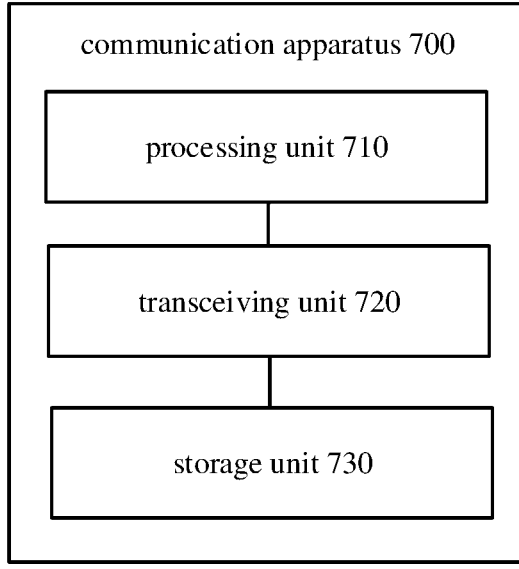
FIG. 7 is a schematic block diagram of a communication apparatus provided by the present disclosure.

FIG. 7 is a schematic block diagram of a communication apparatus provided by an embodiment of the present disclosure. As shown in FIG. 7, the communication apparatus 700 may include a processing unit 710 and a transceiving unit 720.

In a possible design, the communication apparatus 700 may correspond to the terminal device in the above method embodiments, that is, the UE, or a chip configured in (or used in) the terminal device.

It should be understood that the communication apparatus 700 may correspond to the first terminal device or the second terminal device in the methods 400, 500, and 600 according to embodiments of the present disclosure, and the communication apparatus 700 may include units configured to perform the method performed by the first terminal device or the second terminal device in the methods 400, 500, and 600 of FIGS. 4-6. Moreover, each unit in the communication apparatus 700 and the above-mentioned other operations and/or functions are to realize corresponding processes in the methods 400, 500, and 600 of FIGS. 4-6, respectively.

It should also be understood that when the communication apparatus 700 is a chip configured in (or used in) the terminal device, the transceiving unit 720 in the communication apparatus 700 may be an input/output interface or circuit of the chip, and the processing unit 710 in the communication apparatus 700 may be a processor in the chip.

Optionally, the processing unit 710 of the communication apparatus 700 may be configured to process instructions or data to implement respective operations.

Optionally, the communication apparatus 700 may further include a storage unit 730, which may be configured to store instructions or data. The processing unit 710 may perform the instructions or data stored in the storage unit to cause the communication apparatus to implement the respective operations. The transceiving unit 720 in the communication apparatus 700 may correspond to a transceiver 810 in a terminal device 800 shown by FIG. 8, and the storage unit 730 may correspond to a memory in the terminal device 800 shown by FIG. 8.

It should be understood that specific processes for each unit to perform the above corresponding steps has been described in detail in the above method embodiments, and for the sake of brevity, details are not repeated here.

It should also be understood that when the communication apparatus 700 is a terminal device, the transceiving unit 720 in the communication apparatus 700 may be implemented through a communication interface (such as a transceiver or an input/output interface). For example, the transceiving unit 720 may correspond to the transceiver 810 in the terminal device 800 shown in FIG. 8. The processing unit 710 in the communication apparatus 700 may be implemented by at least one processor. For example, the processing unit 710 may correspond to a processor 820 in the terminal device 800 shown in FIG. 8. The processing unit 710 in the communication apparatus 700 may be implemented by at least one logic circuit.

In another possible design, the communication apparatus 700 may correspond to the access network device in the foregoing method embodiments. For example, the communication apparatus 700 may be a chip configured (or used) in the access network device.

It should be understood that the communication apparatus 700 may correspond to the access network device in the methods 400, 500, and 600 according to embodiments of the present disclosure, and the communication apparatus 700 may include units configured to perform the method performed by the access network device in the methods 400, 500, and 600 of FIGS. 4-6. Moreover, each unit in the communication apparatus 700 and the above-mentioned other operations and/or functions are to realize respective processes in the methods 400, 500, and 600 of FIGS. 4-6, respectively.

It should also be understood that when the communication apparatus 700 is the chip configured in (or used in) the access network device, the transceiving unit 720 in the communication apparatus 700 may be the input/output interface or circuit of the chip, and the processing unit 710 in the communication apparatus 700 may be the processor in the chip.

Optionally, the processing unit 710 of the communication apparatus 700 may be configured to process instructions or data to implement respective operations.

Optionally, the communication apparatus 700 may further include a storage unit 730, which may be configured to store instructions or data. The processing unit may execute the instructions or data stored in the storage unit 730 to cause the communication apparatus to implement the respective operations. The storage unit 730 in the communication apparatus 700 may correspond to a memory in an access network device 900 shown in FIG. 9.

It should be understood that specific processes for each unit to perform the above corresponding steps has been described in detail in the above method embodiments, and for the sake of brevity, details are not repeated here.

It should also be understood that when the communication apparatus 700 is the access network device, the transceiving unit 720 in the communication apparatus 700 may be implemented through a communication interface (such as a transceiver or an input/output interface). For example, the transceiving unit 720 may correspond to a transceiver 910 in the access network device 900 shown in FIG. 9. The processing unit 710 in the communication apparatus 700 may be implemented by at least one processor. For example, the processing unit 710 may correspond to a processor 920 in the access network device 900 shown in FIG. 9. The processing unit 710 in the communication apparatus 700 may be implemented by at least one logic circuit.

In another possible design, the communication apparatus 700 may correspond to the AMF node in the above method embodiments. For example, the communication apparatus 700 may be a chip configured (or used) in the AMF node.

It should be understood that the communication apparatus 700 may correspond to the AMF node in the methods 400, 500, and 600 according to embodiments of the present disclosure, and the communication apparatus 700 may include units configured to perform the method performed by the AMF node in the methods 400, 500, and 600 of FIGS.

4-6. Moreover, each unit in the communication apparatus 700 and the above-mentioned other operations and/or functions are to realize respective processes in the methods 400, 500, and 600 of FIGS. 4-6, respectively.

It should also be understood that when the communication apparatus 700 is the chip configured in (or used in) the AMF node, the transceiving unit 720 in the communication apparatus 700 may be the input/output interface or circuit of the chip, and the processing unit 710 in the communication apparatus 700 may be the processor in the chip.

Optionally, the processing unit 710 of the communication apparatus 700 may be configured to process instructions or data to implement respective operations.

Optionally, the communication apparatus 700 may further include a storage unit 730, which may be configured to store instructions or data. The processing unit may execute the instructions or data stored in the storage unit 730 to cause the communication apparatus to implement the respective operations. The storage unit 730 in the communication apparatus 700 may correspond to a memory 1030 in a communication device 1000 shown by FIG. 10.

It should be understood that specific processes for each unit to perform the above corresponding steps has been described in detail in the above method embodiments, and for the sake of brevity, details are not repeated here.

It should also be understood that when the communication apparatus 700 is an AMF node, the transceiving unit 720 in the communication apparatus 700 may be implemented through a communication interface (such as a transceiver or an input/output interface). For example, the transceiving unit 720 may correspond to a transceiver 1010 in the communication device 1000 shown in FIG. 10. The processing unit 710 in the communication apparatus 700 may be implemented by at least one processor. For example, the processing unit 710 may correspond to a processor 1020 in the communication device 1000 shown in FIG. 10. The processing unit 710 in the communication apparatus 700 may be implemented by at least one logic circuit.

Figures 8, 9, 10:
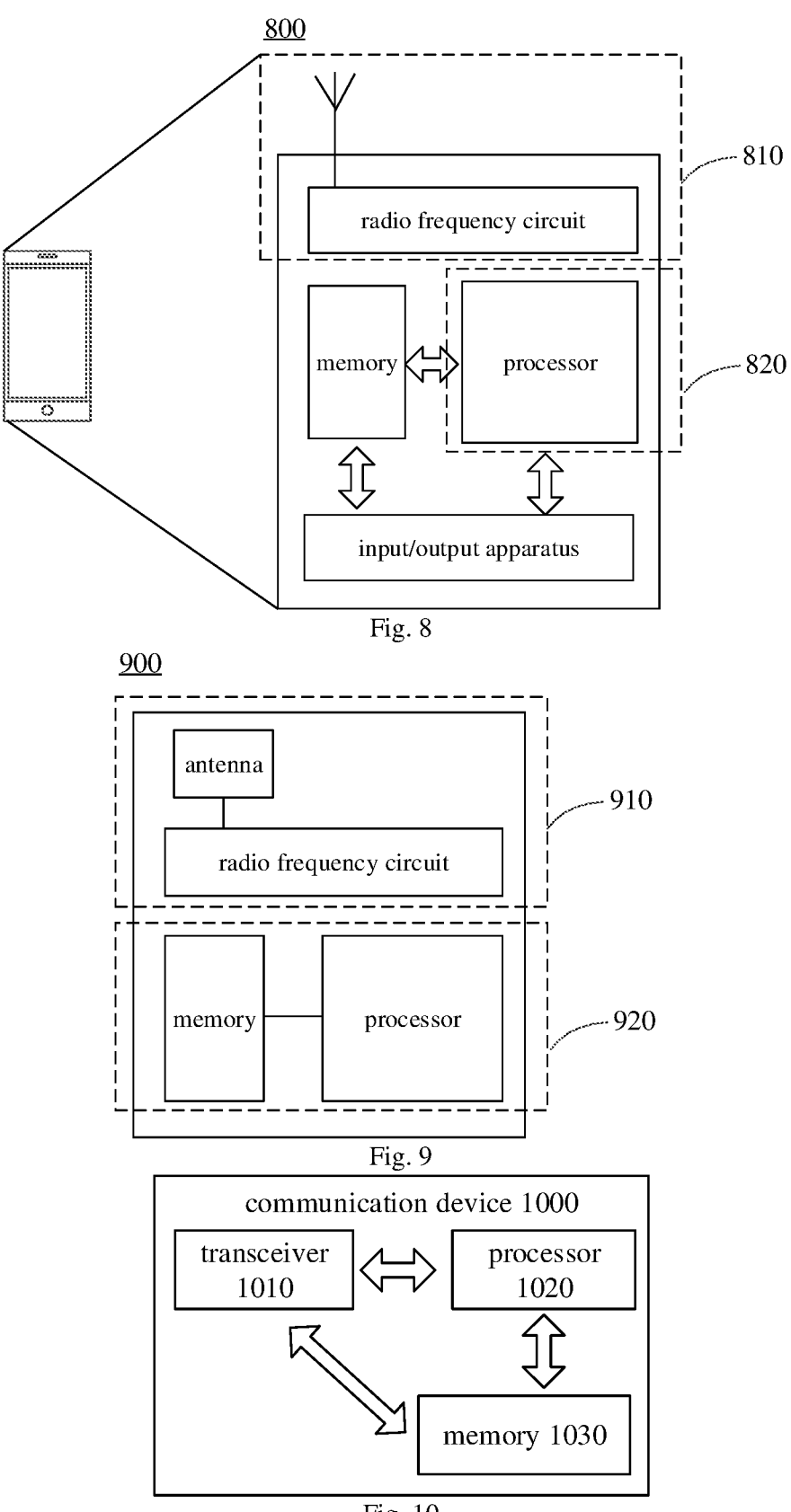
FIG. 8 is a schematic structural diagram of a terminal device provided by the present disclosure.
FIG. 9 is a schematic structural diagram of an access network device provided by the present disclosure.
FIG. 10 is a schematic structural diagram of a communication device provided by the present disclosure.

FIG. 8 is a schematic structural diagram of a terminal device 800 provided by an embodiment of the present disclosure. The terminal device 800 may be applied to the system shown in FIG. 1 to perform functions of the terminal device in the foregoing method embodiments. As shown, the terminal device 800 includes a processor 820 and a transceiver 810. Optionally, the terminal device 800 further includes a memory. The processor 820, the transceiver 810 and the memory may communicate with each other through internal connection paths to transmit control and/or data signals. The memory is configured to store a computer program. The processor 820 is configured to perform the computer program in the memory for controlling the transceiver 810 to send and receive signals.

The processor 820 and the memory may be combined into a processing apparatus, and the processor 820 is configured to execute program codes stored in the memory to realize the above functions. In a specific implementation, the memory may also be integrated in the processor 820, or be independent of the processor 820. The processor 820 may correspond to the processing unit in FIG. 7.

The transceiver 810 may correspond to the transceiving unit 720 in FIG. 7. The transceiver 810 may include a receiver (or called a receiving circuit) and a transmitter (or called a transmitting circuit). The receiver is configured to receive signals, and the transmitter is configured to transmit signals.

It should be understood that the terminal device 800 shown in FIG. 8 may implement respective processes involving the first terminal device or the second terminal device in embodiments of the methods 400, 500, and 600 in FIGS. 4-6. Operations and/or functions of each module in the terminal device 800 are to implement respective processes in the foregoing method embodiments, respectively. For details, reference may be made to the descriptions in the foregoing method embodiments, and detailed descriptions are appropriately omitted here to avoid repetition.

The processor 820 may be configured to perform actions implemented inside the terminal device as described in the foregoing method embodiments, and the transceiver 810 may be configured to perform sending actions by the terminal device to the network device or receiving actions by the terminal device from the network device as described in the foregoing method embodiments. For details, reference may be made to the descriptions in the foregoing method embodiments, and details are not repeated here.

Optionally, the terminal device 800 may further include a power supply, configured to provide power to various devices or circuits in the terminal device.

In addition, in order to improve functions of the terminal device, the terminal device 800 may also include one or more of an input unit, a display unit, an audio circuit, a camera, a sensor, and the like. The audio circuit may further include a speaker, a microphone, etc.

FIG. 9 is a schematic structural diagram of an access network device provided by an embodiment of the present disclosure. The access network device 900 may be applied to the system shown in FIG. 1 to perform functions of the access network device in the foregoing method embodiments. As shown, the access network device 900 includes a processor 920 and a transceiver 910. Optionally, the access network device 900 further includes a memory. The processor 920, the transceiver 910 and the memory may communicate with each other through internal connection paths to transmit control and/or data signals. The memory is configured to store a computer program. The processor 920 is configured to execute the computer program in the memory for controlling the transceiver 910 to send and receive signals.

It should be understood that the access network device 900 shown in FIG. 9 may implement respective processes involving the access network device in embodiments of the methods 400, 500, and 600 in FIGS. 4-6. Operations and/or functions of each module in the access network device 900 are to implement respective processes in the foregoing method embodiments, respectively. For details, reference may be made to the descriptions in the foregoing method embodiments, and detailed descriptions are appropriately omitted here to avoid repetition.

It should be understood that the access network device 900 shown in FIG. 9 is only a possible architecture of the access network device, and should not constitute any limitation to the present disclosure. The method provided by the present disclosure may be applied to access network devices with other architectures, such as an access network device including CU, DU and AAU. The present disclosure does not limit a specific architecture of the access network device.

FIG. 10 is a schematic structural diagram of a communication device provided by an embodiment of the present disclosure. The communication device shown in FIG. 10 has functions of the AMF node. The communication device 1000 may be applied to the system shown in FIG. 1 to perform functions of the AMF node in the foregoing method embodiments. As shown, the communication device 1000 includes a processor 1020 and a transceiver 1010. Optionally, the communications device 1000 further includes a memory. The processor 1020, the transceiver 1010, and the memory may communicate with each other through internal connection paths to transmit control and/or data signals. The memory is configured to store a computer program. The processor 1020 is configured to execute the computer program in the memory for controlling the transceiver 1010 to send and receive signals.

It should be understood that the communication device 1000 shown in FIG. 10 may implement respective processes involving the AMF node in embodiments of the methods 400, 500, and 600 in FIGS. 4-6. Operations and/or functions of each module in the communication device 1000 are to implement respective processes in the foregoing method embodiments, respectively. For details, reference may be made to the descriptions in the foregoing method embodiments, and detailed descriptions are appropriately omitted here to avoid repetition.

Embodiments of the present disclosure further provide a processing apparatus, including a processor and an interface. The processor is configured to perform the method in any one of the above method embodiments.

It should be understood that the above processing apparatus may be one or more chips. For example, the processing apparatus may be a Field Programmable Gate Array (FPGA), an Application Specific Integrated Circuit (ASIC), a System on Chip (SoC), a Central Processor Unit (CPU), a Network Processor (NP), a Digital Signal Processor (DSP), a Micro Controller Unit (MCU), a Programmable Logic Device (PLD), or other integrated chips.

In an implementation process, each step of the above methods may be completed by an integrated logic circuit in the form of hardware or instructions in the form of software of a processor. The method step disclosed in connection with embodiments of the present disclosure may be directly embodied as being performed by a hardware processor, or completed by a combination of hardware and software modules in the processor. The software modules may be located in a mature storage medium in the art, such as a random access memory, a flash memory, a read-only memory, a programmable read-only memory, an electrically erasable programmable memory, or a register. The storage medium is located in a memory. The processor reads information from the memory to complete the above methods in combination with hardware, which will not be specifically described herein to avoid repetition.

It should be noted that the processor in embodiments of the present disclosure may be an integrated circuit chip and has signal processing capability. In an implementation, steps in the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA), other programmable logical device, a discrete gate, a transistor logical device, or a discrete hardware component, which may implement or perform the methods, operations and logical block diagrams disclosed in embodiments of the present disclosure. The universal processor may be a microprocessor, or the processor may also be any conventional processor and the like. The method steps disclosed in combination with embodiments of the present disclosure may be directly embodied as being executed and completed by a hardware decoding processor, or being executed and completed by a combination of hardware and software modules in the decoding processor. The software modules may be located in a mature storage medium in the art, such as a Random Access Memory (RAM), a flash memory, a Read-Only memory (ROM), a Programmable ROM (PROM), Electrically Erasable PROM (EEPROM), or a register. The storage medium is located in a memory. The processor reads information in the memory, and completes steps of the methods in combination with hardware.

According to embodiments of the present disclosure, a computer program product is further provided, including computer program codes. The computer program codes, when executed by one or more processors, cause an apparatus including the processors to perform the methods in the foregoing embodiments.

According to embodiments of the present disclosure, a computer-readable storage medium is further provided, which stores program codes. The program codes, when run by one or more processors, cause an apparatus including the processors to perform the methods in the foregoing embodiments.

According to embodiments of the present disclosure, a system is further provided, including the above-mentioned one or more network devices. The system may further include the above-mentioned one or more terminal devices.

According to embodiments provided by the present disclosure, it should be understood that the disclosed devices and methods may be implemented in other ways. For example, the device embodiments described above are merely illustrative. The division of modules is only a kind of logical function division. In practice implementations, there may be other kinds of division. For example, multiple modules may be combined or integrated into another system, or some features may be ignored or not performed. In addition, the illustrated or discussed mutual coupling or direct coupling or communication connection may be indirect coupling or communication connection through some interfaces or modules, and may be in electrical, mechanical or other forms.

Those described above are merely specific embodiments of the present disclosure, and the protection scope of the present disclosure is not limited thereto. Any change or substitution that is readily conceived of by a person skilled in the art within the technical scope disclosed by the present disclosure shall fall within the protection scope of the present disclosure. Therefore, the protection scope of the present disclosure should be defined by the appended claims.

What is claimed is:

1. A communication method, performed by an access network device, and comprising:
   receiving a first message from a core network node, wherein the first message comprises first identity information, and the first identity information is used for identifying a first terminal device; and
   sending a paging message to a second terminal device according to the first identity information, wherein the second terminal device is determined based on the first identity information,
   wherein a relay service is provided by the second terminal device for the first terminal device, and the paging message is used for paging the first terminal device;
   wherein the first identity information is not released when the second terminal device is in a RRC-connected state;
   wherein the first identity information is a Globally Unique Temporary Identity (GUTI) or a Serving-Temporary Mobile Subscriber Identity (S-TMSI) of the first terminal device, the Serving-Temporary Mobile Subscriber Identity (S-TMSI) being truncated information of the Globally Unique Temporary Identity (GUTI) of the first terminal device; and
   wherein the core network node is an Access and Mobility Management Function (AMF) node.

2. The method according to claim 1, wherein the second terminal device is in a Radio Resource Control (RRC)-connected state.

3. The method according to claim 1, wherein the sending the paging message to the second terminal device according to the first identity information comprises:
   receiving the paging message from the core network node; and
   sending the paging message to the second terminal device according to the paging message and the first identity information.

4. The method according to claim 1, wherein the method further comprises:
   sending a second message to the core network node, wherein the second message is an acknowledgment response message to the first message.

5. A communication device, wherein the communication device is an access network device and comprises:
   a processor, a memory, and an interface configured to communicate with a terminal device, wherein
   the memory is configured to store computer-executable instructions; and
   the processor is configured to execute the computer-executable instructions stored in the memory so that the processor performs a communication method, comprising:
   receiving a first message from a core network node, wherein the first message comprises first identity information, and the first identity information is used for identifying a first terminal device; and
   sending a paging message to a second terminal device according to the first identity information, wherein the second terminal device is determined based on the first identity information,
   wherein a relay service is provided by the second terminal device for the first terminal device, and the paging message is used for paging the first terminal device;
   wherein the first identity information is not released when the second terminal device is in a RRC-connected state;
   wherein the first identity information is a Globally Unique Temporary Identity (GUTI) or a Serving-Temporary Mobile Subscriber Identity (S-TMSI) of the first terminal device, the Serving-Temporary Mobile Subscriber Identity (S-TMSI) being truncated information of the Globally Unique Temporary Identity (GUTI) of the first terminal device; and
   wherein the core network node is an Access and Mobility Management Function (AMF) node.

6. The communication device according to claim 5, wherein the second terminal device is in a Radio Resource Control (RRC)-connected state.

7. The communication device according to claim 5, wherein the sending the paging message to the second terminal device according to the first identity information comprises:
   receiving the paging message from the core network node; and
   sending the paging message to the second terminal device according to the paging message and the first identity information.

8. The communication device according to claim 5, wherein the method further comprises:

sending a second message to the core network node, wherein the second message is an acknowledgment response message to the first message.

9. A communication device, wherein the communication device is an access network device and comprises:

a processor, a memory, and an interface configured to communicate with a terminal device, wherein the memory is configured to store computer-executable instructions; and the processor is configured to execute the computer-executable instructions stored in the memory so that the processor performs a communication method, comprising:

receiving a third message from a second terminal device, wherein the third message comprises first identity information, the first identity information is used for identifying a first terminal device, wherein a relay service is provided by the second terminal device for the first terminal device, and the second terminal device is determined based on the first identity information; and sending a paging message to the second terminal device according to the first identity information, wherein the paging message is used for paging the first terminal device, wherein the first identity information is not released when the second terminal device is in a RRC-connected state;

wherein the first identity information is a Globally Unique Temporary Identity (GUTI) or a Serving-Temporary Mobile Subscriber Identity (S-TMSI) of the first terminal device, the Serving-Temporary Mobile Subscriber Identity (S-TMSI) being truncated information of the Globally Unique Temporary Identity (GUTI) of the first terminal device.

10. The communication device according to claim 9, wherein the second terminal device is in a Radio Resource Control (RRC)-connected state.

11. The communication device according to claim 9, wherein the sending the paging message to the second terminal device according to the first identity information comprises:

receiving the paging message from a core network node; and sending the paging message to the second terminal device according to the paging message and the first identity information.

12. The communication device according to claim 9, wherein the method further comprises:

sending a fourth message to the second terminal device, wherein the fourth message is an acknowledgment response message to the third message.

* * * * *